(No Model.)
H. R. HEYL.
SADDLE SUPPORT FOR BICYCLES.
No. 587,672. Patented Aug. 3, 1897.
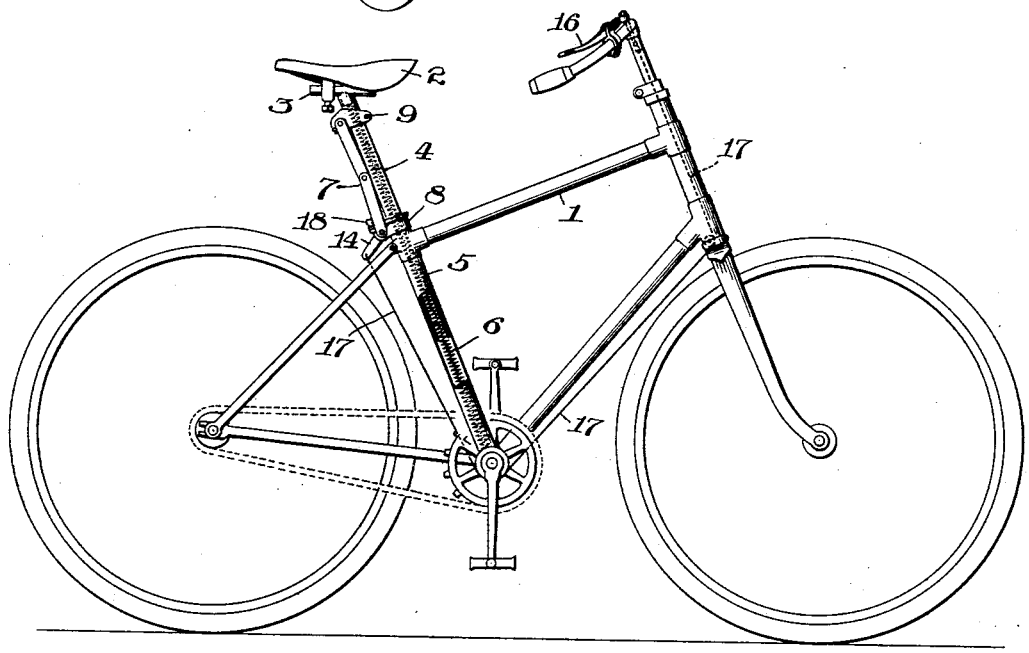
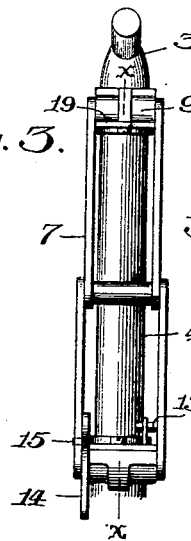
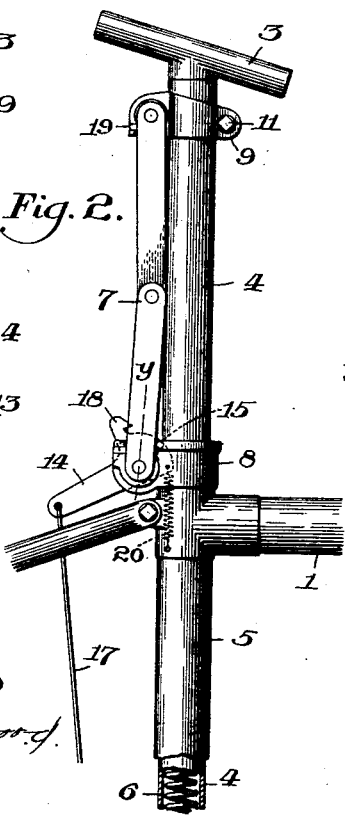
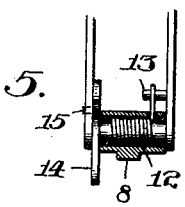
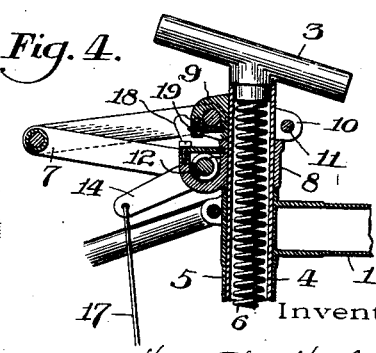
Witnesses.
A. V. Groups
A. V. Blackwood
Inventor,
Henry R. Heyl,
per John R. Nolan
Attorney.
THE NORRIS PETERS CO., PHOTO-LITHO., WASHINGTON, D. C.

United States Patent Office.

HENRY R. HEYL, OF PHILADELPHIA, PENNSYLVANIA, ASSIGNOR TO THE DROP SEAT CYCLE COMPANY, LIMITED, OF SAME PLACE.

SADDLE-SUPPORT FOR BICYCLES.

SPECIFICATION forming part of Letters Patent No. 587,672, dated August 3, 1897.

Application filed June 23, 1896. Serial No. 596,570. (No model.)

*To all whom it may concern:*

Be it known that I, HENRY R. HEYL, a citizen of the United States, residing in the city and county of Philadelphia and State of Pennsylvania, have invented certain new and useful Improvements in Saddle-Supports for Bicycles, &c., of which the following is a full, clear, and exact description, reference being had to the accompanying drawings, forming a part of this specification.

My invention relates to a construction of saddle-supports for bicycles and analogous vehicles whereby the saddle may at the pleasure of the rider while in motion be depressed and raised to any point between the fixed limits of its adjustability, the lowest limit being fixed at an elevation that enables the rider to place both feet upon the ground without dismounting and the extreme upper limit being at the proper height to enable the rider to operate the pedals with the greatest ease and efficiency. I attain these objects by mechanism such as hereinafter described, reference being had to the annexed drawings, in which—

Figure 1 is a side elevation, partly in section, of a bicycle equipped with my improved saddle-support. Fig. 2 is an elevation, enlarged, of the saddle-post, toggle, and adjuncts. Fig. 3 is a rear view thereof. Fig. 4 is a vertical section, as on the line $x\ x$ of Fig. 3, showing the saddle-post as depressed and the toggle collapsed. Fig. 5 is a sectional detail, as on the line $y$ of Fig. 2.

The numeral 1 designates the frame of a bicycle, and 2 the saddle thereon, which saddle is or may be mounted in the usual manner on the post-head 3. This head is affixed to the upper end of a tubular post 4, which is fitted within the vertical tube 5 of the frame, so as to be vertically adjustable within certain limits. Within these tubes is confined a long spiral spring 6, the lower end thereof resting on an abutment at the base of the frame and the upper end bearing against the closed end of the sliding tube. The spring is of sufficient length and strength to sustain the saddle and its supporting-tube in the extreme upper position and yet permit these parts to be depressed to the lowest position, the range of movement being in practice about seven inches. The extreme upper position is such as to enable the rider to operate the pedals with the greatest ease and efficiency and the lowest position is such as to enable him to place both feet upon the ground without dismounting.

As a simple and effective means to sustain the weight of the rider when the saddle is in the elevated position and also to prevent the saddle from turning I employ a toggle 7, the lower end of which is seated to rock in a bearing-bracket 8, secured to the top of the frame-tube, while the upper end of the toggle is similarly seated in a bracket 9, secured to the sliding tube. The bracket 9 is split on one side, as at 10, and is provided with a clamp-screw 11, whereby it (the bracket) may be readily released and adjusted lengthwise of the tube and clamped in the desired position of adjustment. The relation of the parts is such that when the saddle is in the elevated position the toggle is off center, leaning toward and against the sliding tube, as indicated in Figs. 1 and 2. Hence neither the weight of the rider nor the shaking or jolting of the machine can collapse the toggle, for obviously the greater the downward pressure exerted upon the toggle the firmer it will be held in the upright position. In order, however, to avoid any possible liability of the toggle being accidentally displaced by a sudden jar, a torsion-spring 12 is arranged in the lower bearing-bracket, one end of which spring extends through the bracket and bears against a stud 13 on the lower member of the toggle.

When it is desired to depress the saddle, the toggle must be drawn outward beyond the center, in which case the weight of the rider, overcoming the stress of the spring 6, will force the saddle and its adjuncts downward to the lowest limit, as indicated in Fig. 4.

As a convenient means to trip the toggle preparatory to the depression of the saddle there is fulcrumed on the lower bearing-bracket 8 a lever 14, having a stud or projection 15, which is arranged to act against the lower toggle-arm and move it outwardly when the lever is rocked. The operation of the lever is effected by means of a hand-lever 16 on the handle-bar of the machine, which hand-lever is connected with the trip-lever by means of a chain 17 or other equivalent means.

When the saddle is depressed as above stated, it is locked in place by a suitable latch device, which in this instance comprises a hook 18, formed on the lever 14 and so arranged as to engage and catch a plate 19 on the upper bearing-bracket when the saddle is depressed. A spring 20, secured to the lever 14 and to the frame, tends to maintain the said lever in the normal position.

From the foregoing it will be seen that if the trip-lever be pulled downward when the toggle stands upright the latter will be drawn back over the center and the saddle will be depressed by the weight of the rider. Thereupon, by the act of releasing the lever, the hook will operate to seize the saddle-support and hold it down. As the trip-lever is connected with and operated by means of a hand-lever on the handle-bar, as above stated, it will be seen that both saddle-locks are directly under the control of the rider and may thus be instantly operated as occasion may require.

As before mentioned, the toggle serves the double purpose of sustaining the saddle when it is up and of preventing the saddle-support (which is usually and preferably cylindrical) from turning around, thus obviating the necessity of using a spline and key for the latter purpose, which spline and key, by reason of the extreme thinness of bicycle-tubing, would be impracticable.

By the construction above described it will be obvious that a rider is enabled to depress the saddle of the bicycle to its lowest limit, where it is locked fast, and then to seat himself upon the saddle while both feet are on the ground. In this position he may place his feet upon the pedals and start the bicycle. Then at his pleasure he may release the catch that holds the saddle down, and by the act of raising his body upon his feet the saddle will rise with him to its highest position, and thereupon be automatically locked in place.

It will be seen that the depression and elevation of the saddle are the voluntary acts of the rider and may be effected quickly or leisurely at will. He thus has unusual control of the wheel, for when he approaches a place which necessitates cautious riding he can at once depress the saddle and proceed slowly, and if it becomes necessary for him to stop he may do so without dismounting, simply putting his feet upon the ground and sitting still upon the saddle until the way is clear for him to proceed.

I claim—

1. In a vehicle, the combination, with the saddle, a support therefor, and means for normally elevating said saddle, of a toggle operatively connected with said saddle and adapted to sustain the same in the elevated position, substantially as described.

2. In a vehicle, the combination, with the saddle, a support therefor, and means for normally elevating said saddle, of a toggle operatively connected with said saddle, and adapted to sustain the same in the elevated position, and means for tripping said toggle, substantially as described.

3. In a vehicle, the combination, with the saddle, a support therefor, and means for normally elevating the saddle, of a toggle operatively connected with said saddle, and adapted to sustain the same in the elevated position, and means for locking said toggle in its down or folded position against the action of the spring, substantially as described.

4. In a vehicle, the combination, with the saddle, a support therefor, and means for normally elevating the saddle, of a toggle operatively connected with said saddle, and adapted to sustain the same in the elevated position, means for tripping said toggle, and means for locking it in the down or folded position against the action of the spring, substantially as described.

5. In a vehicle, a saddle, the post whereof is fitted to the tubular frame of the vehicle, and an elevating-spring confined within said frame tending to lift the saddle to its highest limit, in combination with a supporting-toggle, one limb of which is connected with said frame and the other limb with the saddle-post whereby the said toggle sustains the saddle in the elevated position, substantially as described.

6. In a vehicle, a saddle, the post whereof is fitted to the tubular frame of the vehicle, and an elevating-spring confined within said frame tending to lift the saddle to its highest limit, in combination with a supporting-toggle, one limb of which is connected with said frame and the other limb with the saddle-post, and means for acting upon the lower limb of the toggle to trip the same, substantially as described.

7. In a vehicle, a saddle, the post whereof is fitted to the tubular frame of the vehicle, and an elevating-spring confined within said frame tending to lift the saddle to its highest limit, in combination with a supporting-toggle, one limb of which is connected with said frame, and the other limb with the saddle-post, and a latch device adapted, when the saddle is depressed, to engage the saddle-post and lock the same against the action of the spring, substantially as described.

8. In a vehicle, a saddle, the post whereof is fitted to the tubular frame of the vehicle, and an elevating-spring confined within said frame tending to lift the saddle to its highest limit, in combination with a supporting-toggle, one limb of which is connected with said frame and the other limb with the saddle-post, means for acting upon the lower limb of the toggle to trip the same, and a latch device adapted, when the saddle is depressed, to engage the saddle-post and lock the same against the action of the spring, substantially as described.

9. The combination, with the supporting-frame, of a saddle the post whereof is fitted to the tubular frame of the vehicle, a spring tending to lift the saddle to its highest limit, an adjustable bearing-bracket on said post, a bearing-bracket on the said frame, and a toggle operatively connected with said brackets, substantially as described.

10. A vehicle-saddle mounted upon a tubular post fitted to slide within a tubular frame, and an elevating-spring confined within the two tubes tending to lift the saddle to its highest limit, in combination with a locking device to hold the saddle at either point of its extreme motion until released by the voluntary act of the rider, substantially as described.

11. A vehicle-saddle mounted upon a tubular post fitted to slide within a tubular frame, and an elevating-spring confined within the two tubes tending to lift the saddle to its highest limit, in combination with a toggle attached at one end to the saddle-post and at its other end to the tubular frame of the vehicle to sustain the saddle when raised to its highest limit against depression by the weight of the rider, and a hand-lever with connections to trip the toggle and thereby allow the saddle to descend, substantially as described.

12. A vehicle-saddle mounted to slide freely up and down within limits, a toggle to support said saddle at its highest limit, one end of which toggle is attached to the movable saddle-support and the other end attached to the vehicle-frame, in combination with a catch-lever which engages with the depressed saddle to hold it down, and a hand-lever with connections to operate the catch-lever to release the saddle at the will of the rider, substantially as described.

13. A vehicle-saddle mounted to slide freely up and down within limits, a toggle to support said saddle at its highest limit, one end of which toggle is attached to the movable saddle-support and the other end attached to the vehicle-frame, in combination with a spring operating to hold the toggle with its center joint resting against the sliding saddle-post, substantially as described.

14. A vehicle-saddle mounted to slide freely up and down within limits, a toggle to support said saddle at its highest limit, one end of which toggle is attached to the movable saddle-support and the other end attached to the vehicle-frame, a lever fulcrumed on said frame and provided with a trip-stud and catch-hook, a projection on the said support for the engagement of the catch-hook when the saddle is depressed, a hand-lever, and connections between the hand-lever and the lever first named, substantially as described.

In testimony whereof I have hereunto affixed my signature in the presence of two subscribing witnesses.

HENRY R. HEYL.

Witnesses:
ANDREW V. GROUPE,
JOHN R. NOLAN.